UNITED STATES PATENT OFFICE.

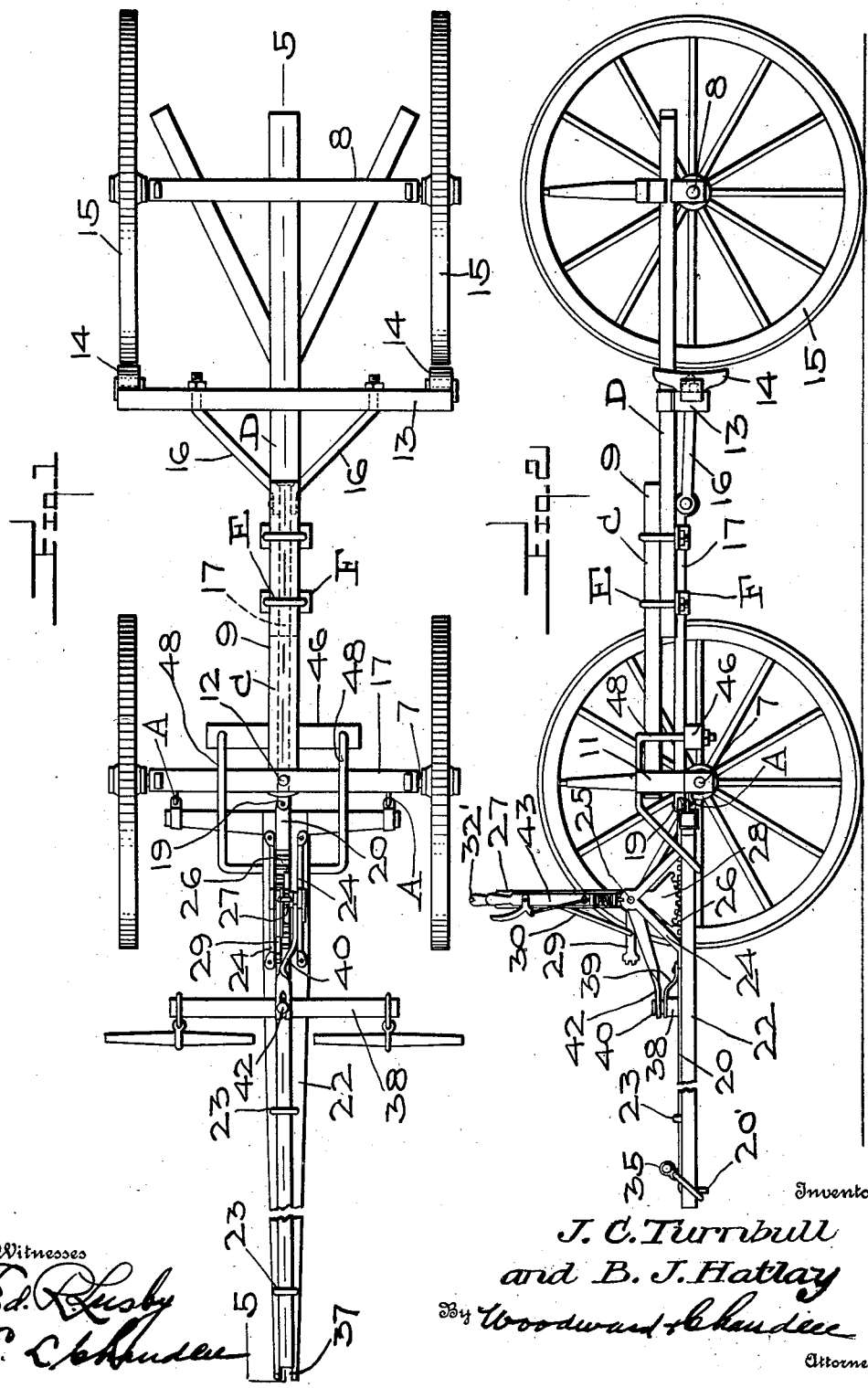

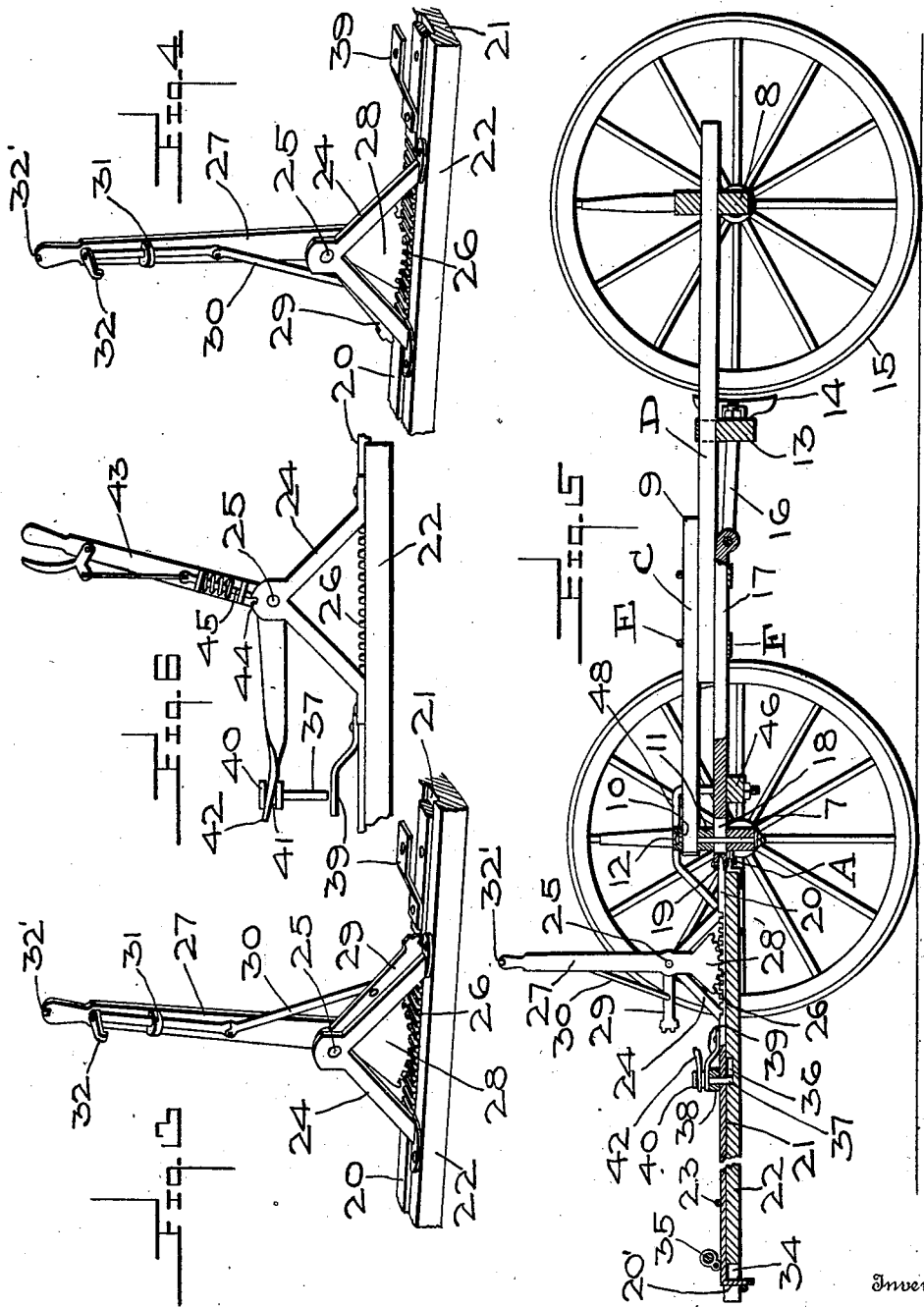

JAMES C. TURNBULL AND BENJIMAN J. HATLAY, OF FENWICK, WEST VIRGINIA.

VEHICLE-BRAKE.

999,919.

Specification of Letters Patent. Patented Aug. 8, 1911.

Application filed May 5, 1909. Serial No. 494,075.

*To all whom it may concern:*

Be it known that we, JAMES C. TURNBULL and BENJIMAN J. HATLAY, citizens of the United States, residing at Fenwick, in the county of Nicholas and State of West Virginia, have invented certain new and useful Improvements in Vehicle-Brakes, of which the following is a specification.

This invention relates to vehicle brake mechanism, and more particularly to braking mechanism for use in connection with horse detaching mechanism, and has for its object to provide a brake mechanism adapted for operation by the draft animal during the use of the vehicle, and also adapted for operation by a hand lever, after the animals have been detached.

Another object is to provide a structure of this kind embodying relatively few parts, and in which means is provided for holding the brake against movement in either direction when desired.

Other objects and advantages will be apparent from the following description, and it will be understood that changes in the specific structure shown and described may be made within the scope of the claims without departing from the spirit of the invention.

In the drawings forming a portion of this specification, and in which like numerals of reference indicate similar parts in the several views, Figure 1 is a top plan of the running gear of a vehicle provided with the present invention, Fig. 2 is a side elevation of the vehicle, the parts being shown in position to permit free operation of the brakes, Fig. 3 is a detail perspective view showing the brake operating mechanism set to hold the brake locked, Fig. 4 is a detail perspective view showing the brake mechanism set in the opposite direction, Fig. 5 is a longitudinal section taken centrally on line 5—5 of Fig. 1, Fig. 6 is a detail view showing the releasing lever moved into position to detach the whiffletree.

Referring now to the drawings, the present vehicle comprises front and rear axles 7 and 8 respectively connected by a reach pole 9. This reach pole, at its forward end, enters an opening 10 in the front axle tree 11, where it is secured by means of a king bolt 12. Slidably mounted upon the rearward portion of the reach pole 9 there is a transversely extending brake beam 13, having brake shoes 14 at its ends arranged to bear against the rearward wheels 15. The brake beam has secured thereto a pair of forwardly convergent rods 16, which are secured at their forward ends to a link 17. This link 17 has a longitudinal slot 18 formed therein which receives the king bolt 12, the link extending through the opening 10, as shown. The forward extremity of the link is bifurcated horizontally, and between the resultant spaced portions 19, there is pivoted the rearward end of a shift rod 20. This shift rod is arranged for longitudinal sliding movement in a groove 21 formed in the upper surface of a tongue 22 and is held in the groove by retaining members 23. The tongue 22 is secured to the forward axle 7 by means of suitable clips A.

Mounted upon the tongue 22 at opposite sides of the groove 21, there are a pair of brackets 24 which extend upwardly, and which have engaged therein the ends of a stationary horizontal shaft 25, which thus extends transversely of the shift rod 20 and is located thereabove. The upper surface of the shift rod is provided with rack teeth 26, and mounted upon the shaft 25 there is a lever 27 having a segmentally formed lower end 28 meshing with the teeth 26. It will be observed that by operation of the lever 27, the shift rod 20 may be moved to operate the brake.

A dog 29 is pivoted upon the shaft 25 for movement into and out of engagement with the rack teeth 26, and as shown in the drawings, this dog may be shifted to lie at opposite sides of the shaft 25 and thus hold the shift rod against movement in either direction as desired. An operating rod 30 is connected with the dog 29 and is engaged through an eye 31 located upon the side of the lever 27. The rod 30 is suitably jointed to facilitate the movement of the dog 29 through vertical movement of the rod as will be understood. A laterally extending member 32 is carried by the upper end of the rod 30 and may be engaged in a notch 32' formed in the upper end of the lever 27 to hold the rod with the dog elevated and out of engagement with the rack teeth 26.

The shift rod 20 extends forwardly, and has its forward extremity bent downwardly, as shown at 20' and extended through a slot 34 formed in the forward portion of the tongue. This downwardly bent portion 20' extends below the tongue, and receives thereagainst the ring of a neck-yoke 35, so that rearward movement of the neck-yoke when the wagon is held back by the team, results in rearward movement of the shift rod and consequent application of the brakes. A longitudinal slot 36 is formed in the tongue 22 and communicates with the groove 21. This slot receives the lower portion of a pivot bolt 37 which is engaged through a whiffletree 38 disposed transversely above and upon the shift rod 20. A member 39 extends upwardly and forwardly from the shift rod and projects over the whiffletree, this member receiving the bolt therethrough. Above the member, the pivot bolt is provided with vertically spaced laterally extending portions 40, and an intervening reduced portion 41. These portions 40 receive therebetween a split foot 42 which extends downwardly and forwardly from a lever 43 mounted upon the shaft 25. These elements form the releasing mechanism and it will be observed, that when the lever 43 is rocked rearwardly, the foot 42 will be raised to disengage the pivot bolt and thus release the whiffletree, in this way freeing the team. After this operation has been performed, the hand lever 27 may be operated to set the brake as previously brought out. The bolt 37 extends downwardly through the slot 36, the end of this slot thus limiting the movement of the bolt longitudinally of the tongue.

The bracket 24 which lies adjacent to the lever 43 is provided with a notch 44 in its upper portion, which receives the end of a locking dog 45, this dog being arranged to hold the lever 43 against movement to release the whiffletree. A transverse member 46 is engaged transversely beneath the reach pole, rearwardly of the front axle 7, and has engaged therein a pair of arms 48 which extend upwardly and over the axle and then downwardly and toward each other beneath the tongue, where they are connected. These arms thus hold the tongue elevated after the team has been detached. As shown, the reach pole 9 is formed in two sections C and D which are connected by means of a clip E. This clip has a transverse member F engaged with its arms beneath the lower section of the reach pole, this member having a downwardly offset central portion receiving the link 17.

From the foregoing, it will be seen that there is provided a mechanism which provides a brake which may be used as an automatic brake under normal circumstances, and as a hand brake when desired.

What is claimed is:

1. The combination with a wagon, of a tongue secured thereto, a bar mounted on the tongue and adapted to be engaged and shifted by the neck yoke, a brake, a link connecting the bar with the brake, rack teeth formed on the upper face of the bar, a bracket secured to the tongue on each side of the rack portion of the bar, a pivot pin connecting the brackets, a lever pivotally mounted on the pin and having a segment shaped toothed head engaging the rack portion of the bar, the pivotal movement of the lever shifting the bar to set or release the brakes, a pawl pivoted on the pin, and connections from the pawl to the lever for operating the pawl to move it into engagement with the portion of the rack on either side of the pivot pin as desired to lock the bar against sliding movement in either direction.

2. In a brake mechanism, the combination with a shift rod, of brake shoes connected with the shift rod for operation thereby, upwardly directed rack teeth carried by the shift rod, a bracket, a lever pivotally mounted in the bracket and having rack teeth engaging the rack teeth of the shift rod, a dog pivotally connected with the bracket for movement to extend at either side of the lever and to engage the rack teeth of the shift rod to hold the shift rod against movement, a rod connected with the dog for movement of the dog out of engagement with the shift rod, and a member carried by the rod and arranged for engagement upon the upper end of the lever to hold the said rod with the dog, out of engagement with the shift rod.

In testimony whereof we affix our signatures, in presence of two witnesses.

JAMES C. TURNBULL.
BENJIMAN J. HATLAY.

Witnesses:
KYLE B. ODELL,
BENJAMIN H. STANLEY.

---

Copies of this patent may be obtained for five cents each, by addressing the "Commissioner of Patents, Washington, D. C."